US005206487A

United States Patent [19]

Susuki et al.

[11] Patent Number: 5,206,487

[45] Date of Patent: Apr. 27, 1993

[54] METHOD OF OPERATING OFFICES OF FINANCIAL INSTITUTES

[75] Inventors: Shozo Susuki, Yokohama; Masanori Kinoshita, Kawasaki; Shigeru Uchino, Yokohama, all of Japan

[73] Assignees: Hitachi, Ltd.; Hitachi System Engineering, Ltd., both of Tokyo, Japan

[21] Appl. No.: 519,472

[22] Filed: May 7, 1990

[30] Foreign Application Priority Data

May 16, 1989 [JP] Japan .................................. 1-120394

[51] Int. Cl.$^5$ ............................................. G06F 15/30

[52] U.S. Cl. ..................................... 235/379; 902/30; 902/31; 902/32

[58] Field of Search .................... 235/379; 902/30, 31, 902/32; 109/2; 221/195

[56] References Cited

U.S. PATENT DOCUMENTS 4,294,380 10/1981 Rankin .................................. 902/30
4,393,788 7/1983 Campbell .............................. 902/31

FOREIGN PATENT DOCUMENTS 6279568 11/1987 Japan .

*Primary Examiner*—Harold Pitts
*Attorney, Agent, or Firm*—Antonelli, Terry, Stout & Kraus

[57] ABSTRACT

In a window of an office of a banking facility, there is disposed a composite apparatus in which a window machine facing the teller is united with an automatic cash handling machine facing the lobby and which is integrally configured in a window counter. During the office hours of the window, the window machine of the composite apparatus is employed by the teller for banking services. In a period of time beyond the office hours, a shutter for prevention of crimes is moved downward onto the window counter, which enables the users to externally access the automatic cash handling machine.

1 Claim, 5 Drawing Sheets

METHOD OF OPERATING OFFICES OF FINANCIAL INSTITUTES

BACKGROUND OF THE INVENTION

The present invention relates to a method of automatically handling cash in an office or a branch of a financial institute, and in particular, to a method of operating offices of financial or banking institutes in which a window counter can be efficiently used in a period of time other than office hours of the window.

In general, an automatic handling of cash or cash transactions in an office of a conventional financial or banking facility is carried out in a particular place (so called an automatic banking machine corner) in the office. The corner is disposed separate, with respect to a place (a counter lobby) of the office, for dedicately handling cash transactions in an automatic fashion. Furthermore, a method in which to improve services for users, a window lobby is disposed in the proximity of an automatic banking machine corner for the user to conduct a cash transaction has been described in JP-A-62-79568, for example.

In accordance with the methods of handling cash in the prior art, a place (a counter lobby) of the office is in any case completely separated from a particular place (an automatic banking machine corner) for dedicately handling cash transactions in an automatic manner. Namely, when the counter of the banking office is closed, the window lobby of the office is separated from the particular place, namely, the automatic banking machine corner by use of a shutter for prevention of crime, thereby enabling the user to handle cash transactions in an automatic fashion.

In accordance with the conventional technology above, when the counter is closed in the office, the lobby of the window is separated from the automatic banking machine corner by means of the shutter, thereby enabling the cash transactions to be carried out in a period of time other than the office hours of the window. However, recently, the usage of automatic cash handling in the period of time after the office is closed has been increasing. In this situation, according to the method of the prior art, there arise problems in the improvement of the service for the user, namely, the users are forced to form a queue waiting for the automatic cash handling, for example. In order to solve the problem, an improvement of the automatic cash handling machine has been achieved such that a period of time necessary for each automatic cash transaction processing time is reduced. However, a method in which the space allocated of the automatic banking machine corner is expanded to install an increased number of automatic banking machines cannot be easily implemented because of a limitation of the space allocated to the office.

SUMMARY OF THE INVENTION

It is therefore an object of the present invention to provide a method of controlling a composite apparatus in an office of a banking facility in which in a period of time when the window near the office is closed, a lobby of the window is used as a place to automatically handle cash transactions by installing an increased number of automatic cash handling machines so as to improve the banking service for the users associated with the cash transactions, thereby removing the problems of the conventional technology.

In order to achieve the object above, there is provided a method apparatus of controlling a composite apparatus in an office of a banking facility in accordance with the present invention in which there is disposed in a window of an office of a banking facility a united or composite device in which a window machine facing a side of a teller is united with an automatic cash handling machine or device facing a side of a lobby of the window. The composite or shared device or apparatus is integrally formed with a counter. Furthermore, there are disposed a shutter to move upward and downward over the counter for prevention of crimes, a terminal controller for controlling said shared apparatus, and a shutter controller for controlling the shutter. In order to control the devices and machines above in a period of time in which the window is closed, the terminal controller and the shutter controller are connected via a communication line or a control line to a host computer of the banking facility.

The window machine in the united apparatus faces the teller side to be operated by the teller for banking transactions. The automatic cash handling machine faces the lobby of the window to be operated by users for automatic cash handling. The host computer of the banking facility instructs, at a time when the office hours begins or ends, namely, when the window is closed or opened, the terminal controller to start or to stop operations of the window machine in the composite apparatus and to initiate or to terminate the cash handling operation of the automatic cash handling device. Moreover, the host computer appropriately instructs the shutter controller to move the shutter upward or downward.

BRIEF DESCRIPTION OF THE DRAWINGS

These and other objects and advantages of the present invention will become apparent by reference to the following description and accompanying drawings wherein.

DESCRIPTION OF THE PREFERRED EMBODIMENT

Figure 1:
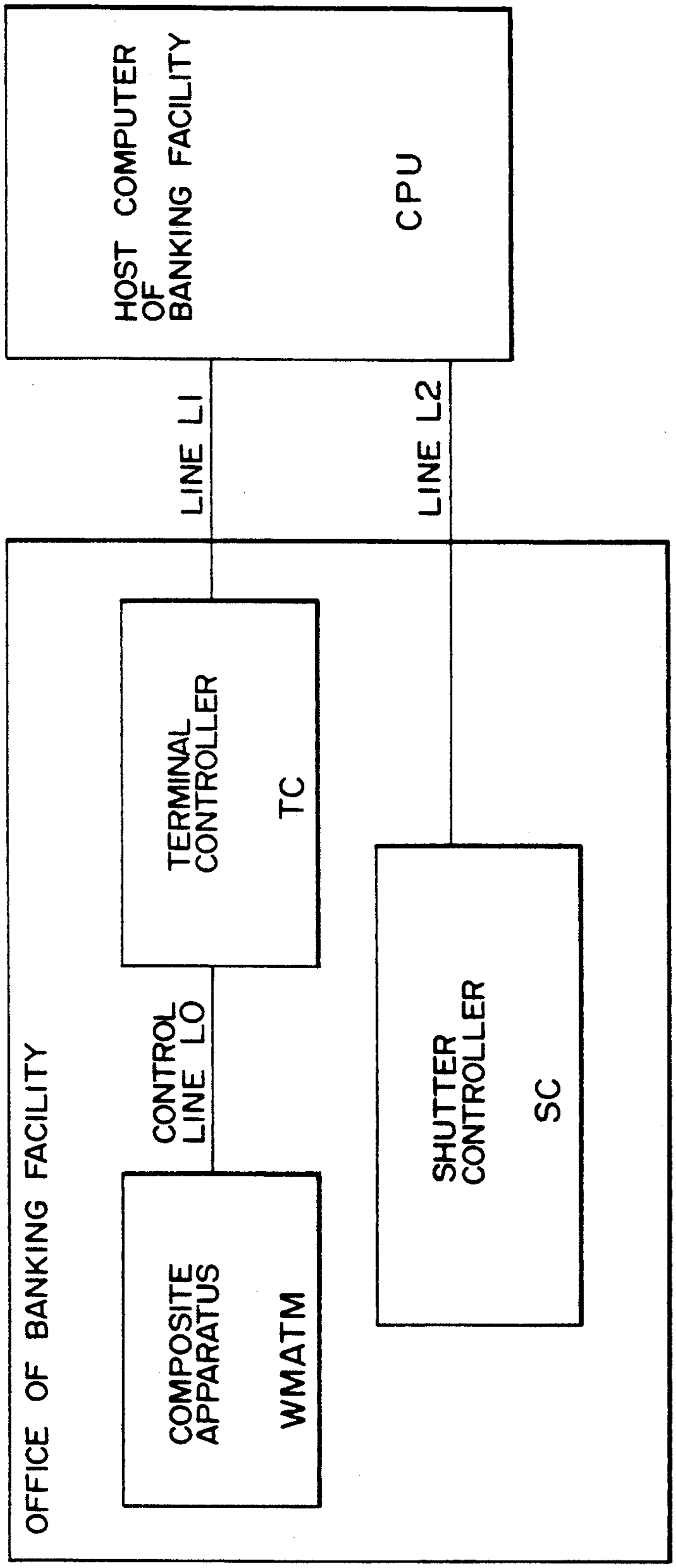
FIG. 1 is a block diagram schematically showing the configuration of a system as an embodiment according to the present invention.

Referring now to drawings, a description will be given in detail of a method of controlling the composite apparatus in an office of a banking facility in accordance with the present invention.

The configuration of the system of FIGS. 1 to 5 includes a composite apparatus WMATM, a terminal controller TC, a host computer CPU, a shutter controller SC, a window counter 21, an automatic cash transaction machine 23, an automatic banking machine corner 24, a partition wall 25, a shutter 26 for prevention of crime, a print mechanism 41, a display 42, a keyboard with a card reader 43, a control mechanism 44, a cash processing mechanism 45, a built-in display with a touch panel 51, a card/receipt slit 52, a passbook slit 53, and a bank note slit 54.

Figure 2:
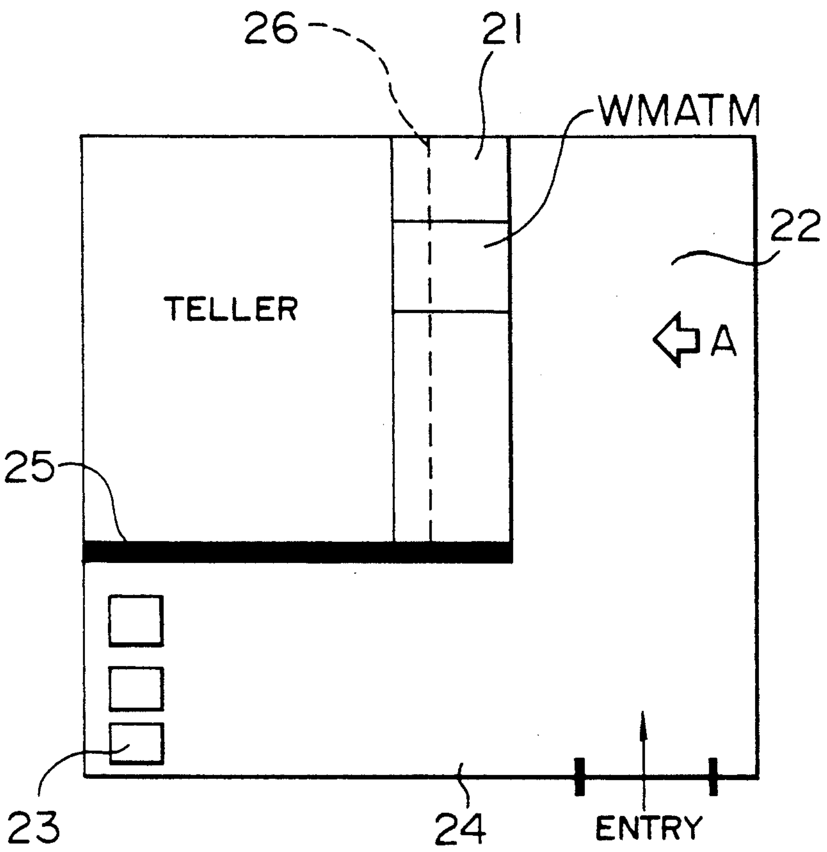
FIGS. 2 and 3 are plan and side views illustratively showing the configuration of an office of a banking facility employing the embodiment according to the present invention.

In the embodiment according to the present invention, as shown in FIG. 1, there is disposed the composite apparatus WMATM in which a window machine is united with an automatic cash handling device, the apparatus being integrally formed with the window counter 21 shown in FIG. 2. The composite apparatus WMATM is connected via a control line L0 to the terminal controller TC. There is also disposed the shutter controller SC for controlling the opening and closing of the shutter 26 of FIG. 2. The terminal controller TC and the shutter controller SC are respectively linked via lines L1 and L2 to the host computer CPU of a banking facility. For the shared apparatus WMATM, the window machine and the automatic cash handling machine may be disposed in a separated fashion so as to be arranged in a housing. Or, a mechanism configuring the window machine and the automatic cash handling machine and a portion of circuits may be shared in the system constitution.

Figure 3:
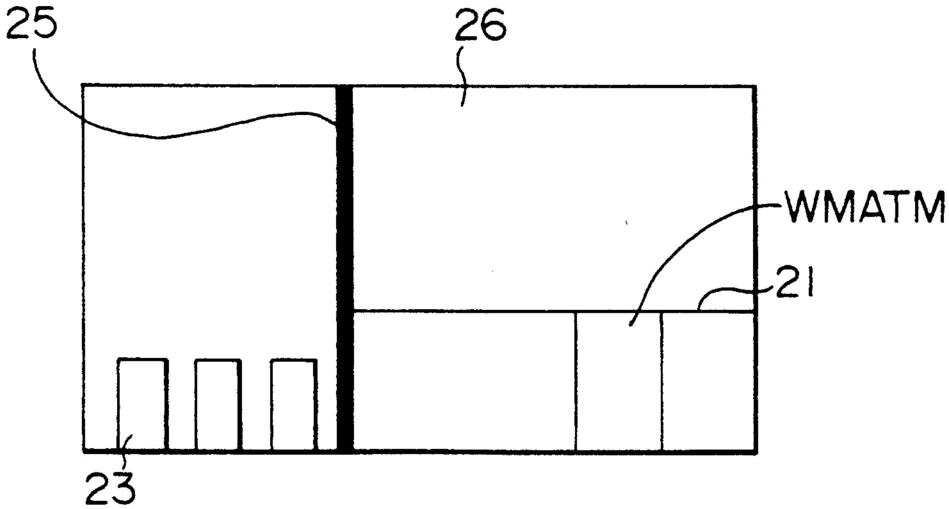

FIGS. 2 and 3 respectively are the plan and side views of a configuration example of apparatuses and machines as an embodiment in an office of a banking facility according to the present invention.

As can be seen from FIG. 2, the composite apparatus WMATM is arranged as a portion of the window counter 21 to form a partition wall between the teller side and the window lobby side. The shutter 26 moves down onto a position indicated on the window counter 21. Moreover, the ordinary automatic cash transaction device 23 is located in the automatic banking machine corner 24 separated from the teller side by use of the partition wall 25.

FIG. 3 is a side view of the configuration in the office viewed from a direction A of FIG. 2. As shown here, the space over the window counter 21 where the shared device WMATM is disposed is open during the business hours of the window. After the window job is finished, the shutter 26 is moved down to a predetermined position on the window counter 21 to separate the teller side from the window lobby side in the office.

Figure 4:
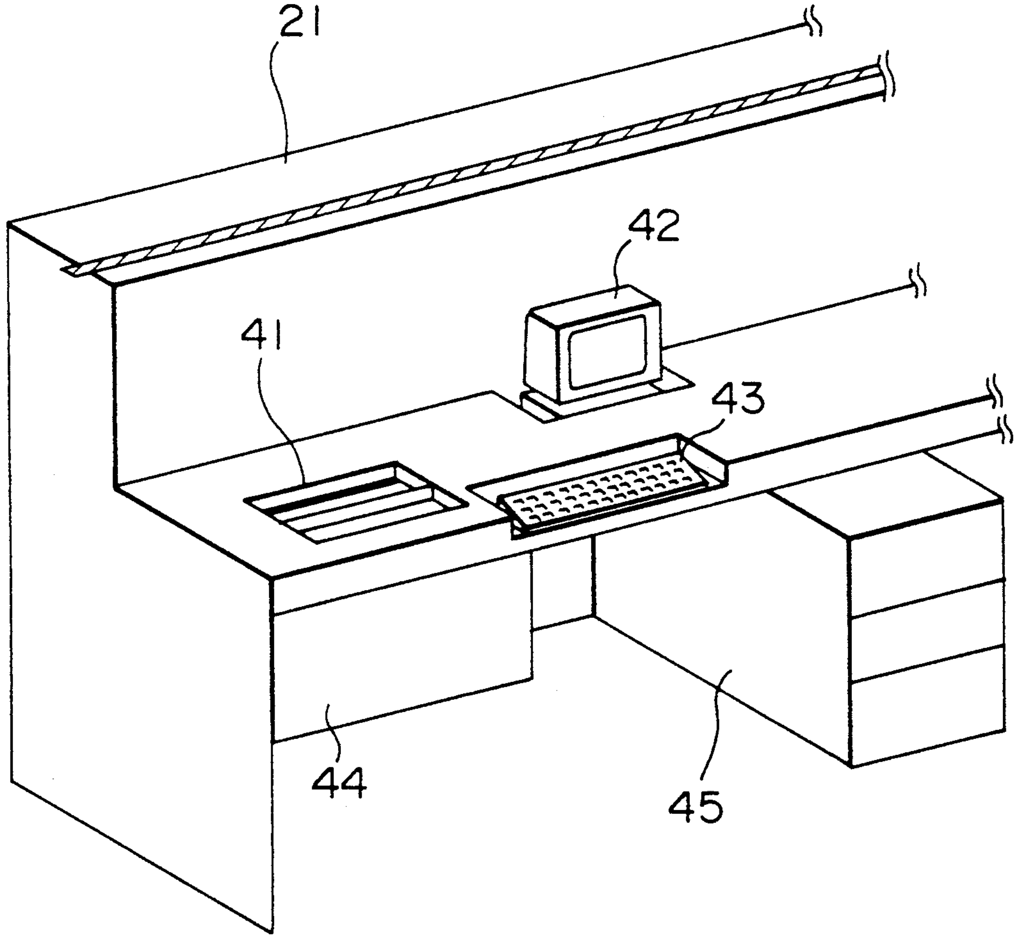
FIGS. 4 and 5 are appearances of a composite apparatus respectively viewed from the teller and window lobby sides.

FIG. 4 shows an appearance of the composite apparatus WMATM viewed from the teller side. More concretely, there is shown the window machine of the device WMATM to be operated on the teller side.

As shown in FIG. 4, the window machine includes a print mechanism 41 for achieving print operations on a passbook, a slip, etc., a display equipment 42, a keyboard with a card reader 43, and a cash processing mechanism 45. The window machine is to be operated by the teller during the business hours of the window.

Figure 5:
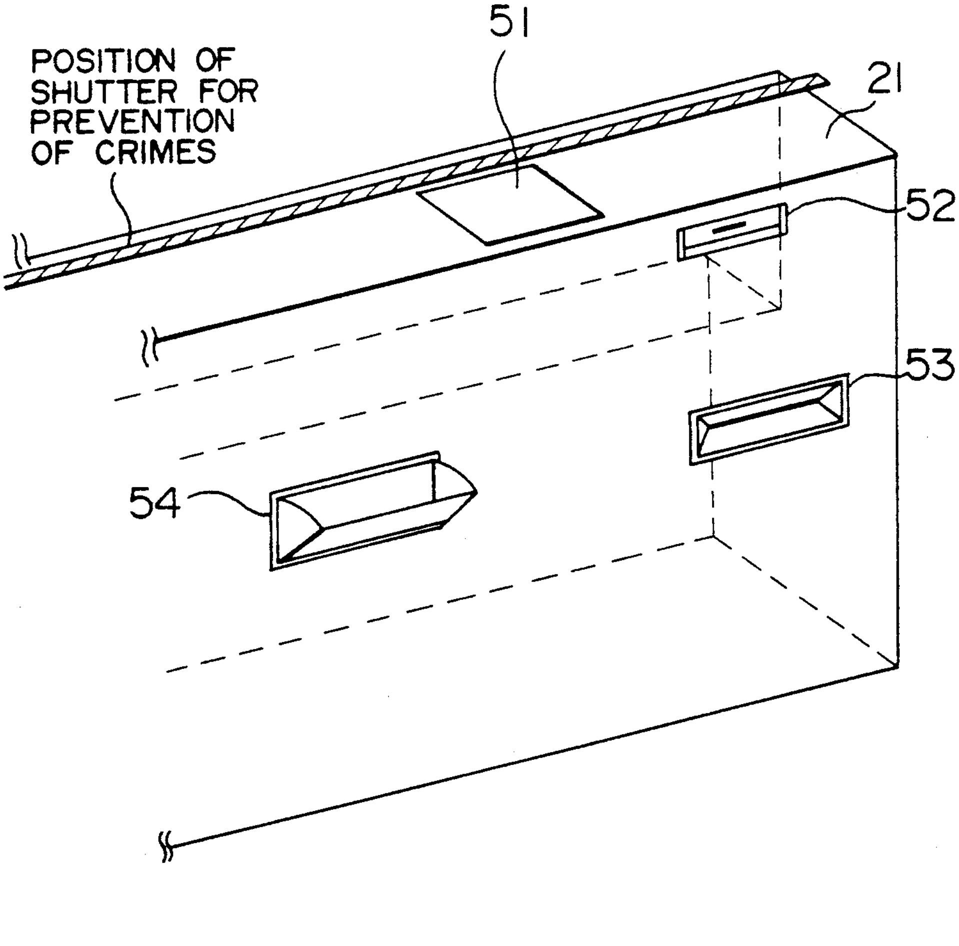

On the other hand, FIG. 5 shows the composite apparatus WMATM viewed from the window lobby side. Namely, there is shown the automatic cash handling machine to be operated by the user of the banking facility. As shown here, this machine comprises a display 51 buried therein, the display 51 having a touch panel as an input device; a card/receipt slit 52, a passbook slit 53, and a bank note slit 54. The automatic cash handling machine is to be operated by the user of the banking facility, like the automatic cash transaction machine 23, during a period of time other than the business hours of the window.

In FIGS. 4 and 5, the window counter 21 is located on an upper plane of the composite apparatus WMATM, whereas the shutter 26 is moved down onto a predetermined position, as indicated in the diagrams, on the upper surface of the window counter 21.

Figure 6:
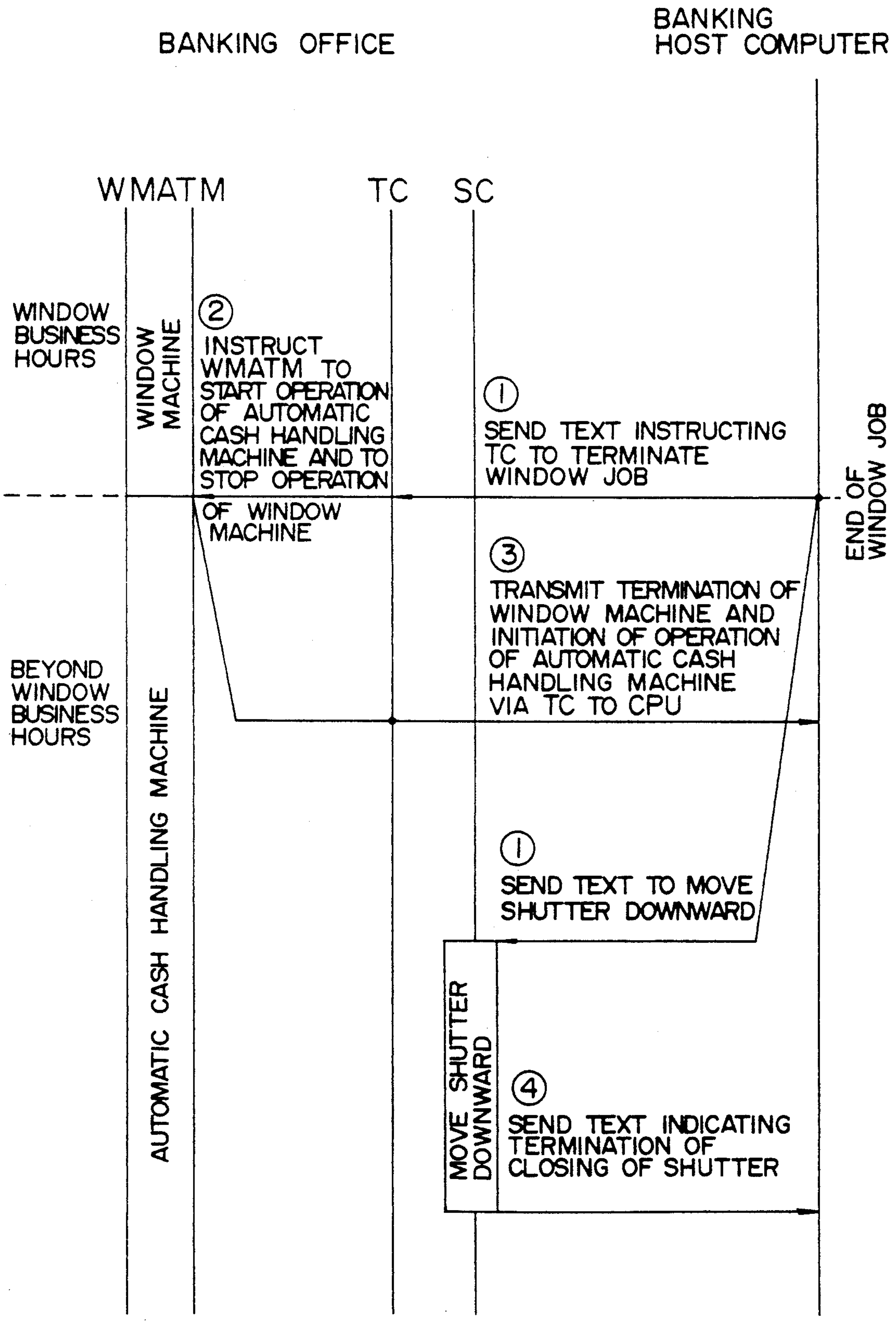
FIG. 6 is an explanatory diagram for explaining the operation of the embodiment according to the present invention.

Referring next to FIG. 6, a description will be given of the operation of an embodiment thus configured in accordance with the present invention.

During the office hours of the window in the banking facility, the composite apparatus WMATM is used as a window machine to be operated on the teller side. The window job of a banking facility is ordinarily ended at 15:00. At this moment, the host computer CPU is initiated in response to a time signal to send a text instructing a termination of the window job via the line L1 to the terminal controller TC in the office. On receiving the text, the terminal controller TC achieves control via the control line L0 to start the operation of the automatic cash handling machine of the composite apparatus WMATM and to terminate the operation of the window machine. In response to the control, the shared device WMATM notifies the termination of the window machine and the completion of the operation start of the automatic cash handling machine via the terminal controller TC to the host computer CPU.

The host computer CPU sends a text instructing a termination of the window job via the line L1 to the terminal control unit TC; furthermore, at the same time transmits a text to instruct the closing of the shutter 26 via the line L2 to the shutter controller SC. On receiving the text, the shutter control unit SC moves down the shutter. When a bottom surface of the shutter is brought into contact with the upper surface of the window counter 21 of the composite device WMATM, the shutter controller SC senses the condition and then transmits a text indicating the termination of the closing of the shutter to the host computer CPU.

Through the operations above, the host computer CPU confirms that the composite device WMATM is operating as an automatic cash handling machine. Thereafter, the embodiment according to the present invention functions as an automatic cash handling machine which can be operated by the users of the banking facility.

In the description of the embodiment according to the present invention, the configuration includes the host computer CPU of a banking facility linked via communication lines with the composite apparatus WMATM and the shutter controller SC. However, in accordance with the present invention, the composite apparatus WMATM and the shutter controller SC may be directly connected to each other by means of a communication of control line. In such a case, the signal indicating the termination of the closing of the shutter is sensed by the shutter controller SC. As a result, the shutter controller SC sends a text indicating the termination of the closing of the shutter via the composite apparatus WMATM and the shutter controller SC to the host computer CPU of the financial facility.

The embodiment according to the present invention has been described by reference to an example of the operation to be conducted when the office hours are finished at the window of the banking facility. In contrast thereto, at an initiation of the window job, the operations above need only be reversely accomplished to move the shutter upward. In short, prior to the commencement of the job in the window, the composite apparatus WMATM is operated as an automatic cash handling machine. At a time when the window is to be opened to start jobs thereof, the host computer CPU instructs the shutter controller SC to move the shutter upward and simultaneously to stop the operation of the automatic cash handling machine of the composite apparatus WMATM, thereby starting the operation of the window machine.

In the description of the embodiment according to the present invention, the composite apparatus includes a window machine and an automatic cash handling machine. However, in accordance with the present invention, there may be used as many composite apparatuses as can be arranged on the window counter.

According to the present invention, as described above, in the automatic cash handling in the period of time beyond the office hours of the window, a window counter integrally configured with the composite apparatus is employed to separate by use of a shutter between the teller side and the window lobby side. Furthermore, the automatic cash handling can be conducted on the window side. In consequence, the automatic cash handling can be achieved not only in the automatic banking machine corner disposed in the conventional banking office but also in the window lobby. As a result, the space of the office can be more efficiently utilized and the queue of the users awaiting the automatic cash handling is minimized to improve the services for the users.

While the particular embodiment of the invention has been shown and described, it will be obvious to those skilled in the art that various changes and modifications may be made without departing from the present invention in its broader aspects.

We claim:

1. An apparatus for use at a transaction location, said transaction location including a teller side area and a customer side area, said apparatus comprising:
- a window machine for use by a teller,
- an automatic cash handling machine for use by customers,
- a movable shutter located between the window machine and the automatic cash handling machine, and
- interlock control means for only activating said window machine as said movable shutter is raised and until said movable shutter is lowered to remove a separation between the teller side area and the customer side area and only controlling said automatic cash handling machine as said movable shutter is lowered and until said movable shutter is raised to provide the separation between the teller side area and the customer side area.

* * * * *